(12) United States Patent
Lowry et al.

(10) Patent No.: US 6,460,759 B1
(45) Date of Patent: Oct. 8, 2002

(54) MULTI-PLY COMPOSITE CONTAINER WITH REGIONS OF WEAKENED STRENGTH AND METHOD FOR MANUFACTURING SAME

(75) Inventors: James W. Lowry, Florence; Manson Drew Case; Kenan J. Clougherty, both of Hartsville, all of SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/561,662

(22) Filed: May 2, 2000

(51) Int. Cl.⁷ .................................................. B65D 3/26
(52) U.S. Cl. .................................... 229/201; 229/101.2
(58) Field of Search .......................... 229/4.5, 5.5, 5.8, 229/235, 101.1, 101.2, 201

(56) References Cited

U.S. PATENT DOCUMENTS

| | | | |
|---|---|---|---|
| 1,502,864 A | | 7/1924 | Milligan |
| 1,560,681 A | | 11/1925 | Fisher |
| 1,598,951 A | | 9/1926 | Wright |
| 1,773,553 A | * | 8/1930 | Taylor et al. ................. 229/5.5 |
| 1,961,556 A | | 6/1934 | Fallows |
| 1,961,559 A | | 6/1934 | Herrmann |
| 1,961,560 A | | 6/1934 | Herrmann |
| 1,963,994 A | | 6/1934 | Herrmann |
| 1,967,931 A | | 7/1934 | Fox |
| 2,009,539 A | | 7/1935 | Wootton |
| 2,033,724 A | | 3/1936 | Marshall |
| 2,053,726 A | | 9/1936 | Marshall |
| 2,094,241 A | | 9/1937 | Herrmann |
| 2,112,571 A | | 3/1938 | Marshall |
| 2,120,898 A | | 6/1938 | Moore |
| 2,152,400 A | | 3/1939 | Rold |
| 2,173,585 A | * | 9/1939 | Harrison ...................... 229/5.5 |
| 2,447,096 A | | 8/1948 | Schneider |
| 2,578,244 A | * | 12/1951 | Harrison ...................... 229/5.5 |
| 2,623,681 A | | 12/1952 | Wilcox |
| 2,717,619 A | | 9/1955 | Whitman |
| 2,852,179 A | | 9/1958 | Bieler |
| 2,949,369 A | | 8/1960 | Zoeller et al. |
| 2,969,902 A | | 1/1961 | Cage |
| 3,086,692 A | | 4/1963 | Cage |
| 3,116,868 A | | 1/1964 | Lazure |
| 3,120,900 A | | 2/1964 | Faulstich |
| 3,137,437 A | | 6/1964 | Svensson |
| 3,144,194 A | | 8/1964 | Cartwright |
| 3,167,238 A | | 1/1965 | Smith |
| 3,223,230 A | | 12/1965 | Bianchi |
| 3,224,633 A | | 12/1965 | Allen |
| 3,226,527 A | | 12/1965 | Harding |
| 3,235,167 A | | 2/1966 | Svensson |
| 3,281,059 A | | 10/1966 | Buttery et al. |
| 3,285,496 A | | 11/1966 | Barnhardt, Sr. et al. |
| 3,302,855 A | | 2/1967 | Becker |
| 3,368,738 A | | 2/1968 | Roccaforte et al. |

(List continued on next page.)

FOREIGN PATENT DOCUMENTS

| | | |
|---|---|---|
| EP | 0 210 118 A1 | 1/1987 |
| FR | 1565609 | 3/1969 |

*Primary Examiner*—Gary E. Elkins
(74) *Attorney, Agent, or Firm*—Alston & Bird LLP

(57) ABSTRACT

A multi-ply composite container for consumer products with at least one region of weakened strength and method for manufacturing same is provided. The composite container includes a multi-ply composite tube having a tubular body ply, a liner ply adhered to the inner surface of the tubular body ply and a label ply adhered to the outer surface of the body ply. The composite container also includes at least one circumferential score line in the multi-ply composite tube through the label ply and the body ply. The container and method overcome limitations imposed by conventional composite containers by providing a composite container which provides for easy opening, better consumer access, resealability, storage for left over food product, and easier consumer recycling.

4 Claims, 6 Drawing Sheets

U.S. PATENT DOCUMENTS

| | | |
|---|---|---|
| 3,580,481 A | 5/1971 | Koboldt |
| 3,909,582 A | 9/1975 | Bowen |
| 3,960,624 A | 6/1976 | Erlandson |
| 3,967,773 A | 7/1976 | Kaufmann |
| 3,973,719 A | 8/1976 | Johnson et al. |
| 4,091,929 A | 5/1978 | Krane |
| 4,174,476 A | 11/1979 | Boling et al. |
| 4,211,360 A | 7/1980 | Scott et al. |
| 4,349,110 A | 9/1982 | Hayashi |
| 4,537,809 A | 8/1985 | Ang et al. |
| 4,556,166 A | 12/1985 | Penttilä |
| 4,557,414 A | 12/1985 | Ford et al. |
| 4,606,462 A | 8/1986 | Bogren |
| 4,740,163 A | 4/1988 | Kuchenbecker |
| 4,762,233 A | 8/1988 | Sears et al. |
| 4,762,514 A | 8/1988 | Yoshida |
| 4,815,609 A | 3/1989 | Kiedaisch |
| 4,951,836 A | 8/1990 | Yoshimura et al. |
| 5,000,321 A | 3/1991 | Heilmann et al. |
| 5,042,666 A | 8/1991 | Dolenc |
| 5,205,479 A | 4/1993 | Rice et al. |
| 5,217,164 A | 6/1993 | Sullivan |
| 5,229,180 A | 7/1993 | Littmann |
| 5,234,123 A | 8/1993 | Layre et al. |
| 5,236,120 A * | 8/1993 | Kleemola .................. 229/201 |
| 5,326,023 A | 7/1994 | Rice et al. |
| 5,470,016 A | 11/1995 | Ljungström et al. |
| 5,566,529 A | 10/1996 | Sireix |
| 5,626,250 A | 5/1997 | Dorazio |
| 5,704,539 A | 1/1998 | Ljungström et al. |
| 6,015,061 A | 1/2000 | Lowry |
| 6,047,878 A | 4/2000 | Lowry |
| 6,142,366 A * | 11/2000 | Sagel ...................... 229/101.2 |

* cited by examiner

MULTI-PLY COMPOSITE CONTAINER WITH REGIONS OF WEAKENED STRENGTH AND METHOD FOR MANUFACTURING SAME

FIELD OF THE INVENTION

The present invention relates to composite containers for food products, and more particularly, to multi-ply containers constructed of a paperboard body ply, an inner liner ply and a label ply.

BACKGROUND OF THE INVENTION

Multi-ply composite containers are used for packaging a wide variety of food and drink products as well as other perishable items. These multi-ply containers are constructed to be opened at either one of two spaced ends that are sealed, either permanently or with a removable seal. Some of these containers can also be opened along a sidewall seam in order to gain product access. To package such perishable food products, a container is required that is rigid enough to retain its shape during shipping and when subjected to internal pressure that is sometimes produced in the container, while tightly sealing the food product to protect against deterioration, leakage and contamination. Thus, these composite containers conventionally include three separate plies or sets of plies and two end closures.

First, at least one structural body ply made of paperboard material is included, which is formed into a tubular structure by wrapping a continuous strip of body ply paperboard material around a shaping mandrel. The body ply is spirally wound around the mandrel or passed through a series of forming elements so as to be wrapped in a convolute shape around the mandrel. These containers also typically include a liquid impermeable liner ply adhered to the inner surface of the paperboard body ply. The liner ply seals the food product within the container, and also prevents liquids, which may possibly contaminate the food product, from entering the container. Some liner plies are also gas impermeable, so as to not only prevent food product odors from escaping the can, but also prevent atmospheric air from entering the container and spoiling the food product. Thus, while the purpose of the body ply is to provide necessary structural properties to the container, the liner ply provides various properties necessary to contain and maintain the perishable food product.

A label ply is also included, and is adhered to the outer surface of the paperboard body ply. The label ply serves two primary functions. First, a composite can label is a source of information. The label carries graphical matter that conveys product information, instructions, and regulatory compliance information. The label is also aesthetically pleasing to the consumer, which enhances shelf appeal and increases consumer interest in the food product.

In addition to the three separate plies which make-up the multi-ply composite container, these composite containers typically also include metallic or plastic end closures configured to engage the end portions of the paperboard body ply. The metal or plastic ends serve to provide rigidity to the composite containers while retaining the food product.

A critical factor in composite container design is the ease with which such containers may be opened, and composite containers are often designed to incorporate different opening features. For example, composite containers for leavened dough products are normally opened by removing completely the label ply from the paperboard body ply, whereupon the container is forcibly struck against a sharp surface, such as the edge of a kitchen counter. The force of striking the container against the sharp surface, in conjunction with internal can pressure produced by the leavened dough, causes the helical butt joint of the body ply and the inner liner ply to rupture, exposing the food product and allowing it to be removed from the container. For example, U.S. Pat. No. 2,949,369 to Zoeller discloses a compartmented dough package for storing leavened dough wherein when the container is to be opened so as to prepare the food product stored in the can for use, the can sidewall is circumferentially split and the product can readily be removed from the container.

Where the food product is potato crisps, on the other hand, the composite container is typically designed with a metal closure at one of its ends, and a removable foil seal with a plastic end cap at the other. In this way, the container is easily reclosed after the foil seal is broken. Thus, left over food product can be easily stored in the reclosable container.

One common problem with composite container designs is that one or more of the metal or plastic ends of these containers remain attached in whole or in part to the can body after the can is opened. Thus, the end closures are difficult to remove from the can body to permit recycling of the can body and the ends. This often results in expensive and complicated opening features, and composite containers which are difficult to recycle because the ends and the body ply are made of different materials.

Another problem commonly associated with composite container product packaging is that the volume of the composite container is fixed, while the volume of the food product within the container diminishes as the food is consumed. Thus, when a tall, narrow tubular food product container is used to package snacks or other consumable products such as potato crisps, the consumer is often unable to reach the food near the bottom of the container. The container is too small in diameter to allow an adult hand to reach into the container, and too tall to allow the fingers alone to reach the food near the container bottom.

Some container designs have attempted to overcome this problem using a sectionable container. For example, U.S. Pat. No. 2,969,902 discloses a container having a plurality of sections which are separately removable with different portions of the body. The design of the '902 patent is limited, however, in that it is constructed using a complicated series of premanufactured rings and sections that are assembled and then secured together by a sheet of material adhesively secured around the rings. Furthermore, the label on the outside of the container must be cut so that the container may be sectioned making the container difficult to break apart.

Accordingly, it would be desirable to provide a low cost multi-ply composite container and a method for manufacturing such a container which provides for easy opening, better consumer access, and encourages consumer recycling. Such a container would not only result in decreased production costs and reduce inefficiencies in the manufacture of composite containers, but would also result in an "environmentally friendly" composite container.

SUMMARY OF THE INVENTION

These and other objects and advantages are provided, according to the present invention, by a multi-ply composite container for consumer products with at least one region of weakened strength. The multi-ply composite container comprises a multi-ply composite tube that includes a body ply formed of paperboard material, a liner ply adhered to the inner surface of the tubular body ply and a label ply adhered to the outer surface of the body ply. The multi-ply composite tube also comprises at least one circumferential score line in the multi-ply composite tube through the label ply and the body ply that creates a region of weakened strength. The circumferential score line may extend partially around the circumference of the multi-ply composite tube or around the entire circumference of the multi-ply composite tube. This at least one circumferential score line advantageously allows the volume of the multi-ply composite container of the present invention to be reduced as the volume of food product in the container is reduced. The multi-ply composite container may also advantageously include at least one angular score line in the multi-ply ply composite tube through the film label ply and the body ply intersecting the circumferential score line.

In one embodiment, the composite container also includes at least one composite end closure having a liner ply and a body ply that is secured to one of the two opposed ends of the multi-ply composite tube. In this embodiment, at least one arcuate score line through the body ply of the end closure may be included to advantageously create a region of weakened strength in the composite end closure. In another embodiment, at least one angular score line may also be included through the body ply of the composite end closure intersecting the arcuate score line. Such an arrangement makes the multi-ply composite container of the present invention more environmentally friendly because it provides for composite end closures as opposed to metallic or plastic end closures.

The advantageous method of forming a multi-ply composite container for consumer products with at least one region of weakened strength includes the steps of advancing a continuous body ply formed of paperboard material towards a shaping mandrel and advancing a continuous liner ply having a moisture barrier layer towards the shaping mandrel. The body ply and the liner ply are then wrapped around the shaping mandrel to adhere the liner ply to the body ply. Next, a continuous label ply is advanced towards the shaping mandrel downstream of the adhered liner ply and body ply. Then, the label ply is wrapped around the body ply and the liner ply to adhere the label ply to the body ply and the liner ply to create a multi-ply composite tube. The multi-ply composite tube is then scored through the label ply and the body ply to create a region of weakened strength in the composite tube.

The step of scoring the label ply and the body ply may comprise perforating the multi-ply composite tube or grooving the multi-ply composite tube. In one embodiment, the scoring step includes scoring the label ply and the body ply with a laser. In another embodiment, the scoring step includes scoring the label ply and the body ply with a knife.

Consequently, the container and method of the present invention overcome limitations imposed by conventional composite containers and methods of manufacturing such containers. In particular, the multi-ply composite container and method for manufacturing same of the present invention provide a composite container which provides for easy opening, better consumer access, resealability, storage for left over food product and encourages consumer recycling. The container and method of the present invention will therefore not only result in decreased production costs and reduce inefficiencies in the manufacture of composite containers, but also will produce a more useful, "environmentally friendly" composite container.

BRIEF DESCRIPTION OF THE DRAWINGS

Some of the objects and advantages of the invention have been set forth, and other objects and advantages of the invention will become apparent in the detailed description of the preferred embodiments of the invention to follow, especially when taken in conjunction with the accompanying drawings, which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
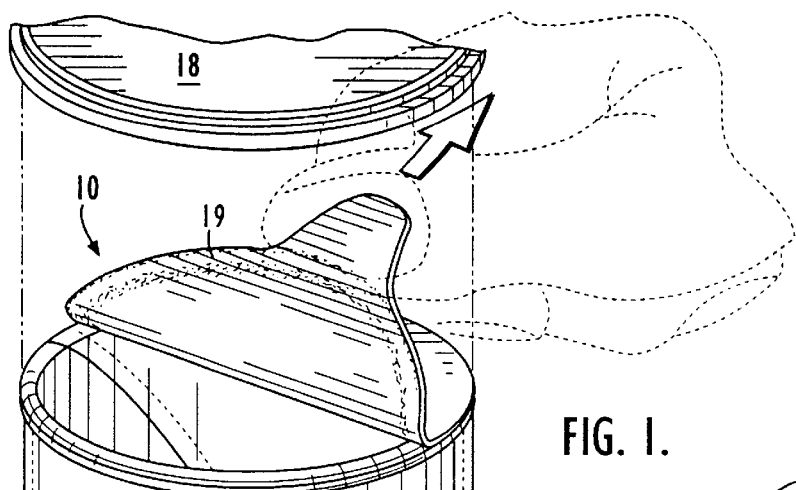
FIG. 1 is a perspective view of a multi-ply composite container according to the present invention.

FIG. 1 illustrates a tubular multi-ply composite container 10 for consumer products with at least one region of weakened strength according to the present invention. Although illustrated as having a circular cross section, the tube may have any cross sectional shape which can be formed by wrapping the tube around an appropriately shaped mandrel. One example is a generally rectangular shape having rounded corners.

The embodiment illustrated in FIGS. 1 through 5 is particularly advantageous for packaging potato crisps and, as shown in FIG. 1, includes a tubular body ply 12 formed of paperboard material, a liner ply 14 adhered the inner surface of the tubular body ply 12, and a label ply 16 adhered to the outer surface of the tubular body ply 12. The composite container 10 also includes an overcap 18, a flexible seal 19 or membrane and a plastic or metal end closure 20.

Various other end closures may be used, depending upon the type of food product which is to be packaged such as, for example, frozen concentrated juice.

The composite container 10 also includes a number of score lines 22 extending circumferentially about the composite container 10. The score lines 22 may extend only partially about the circumference of the composite container 10 or may extend completely about the circumference of the composite container 10. As illustrated in more detail in FIG. 2, the score lines 22 are cut into the label ply 16 and through the body ply 12, but not into the liner ply 14 of the composite container 10. The score lines 22 may either be perforated score lines or a series of discontinuous grooves as demonstrated in FIGS. 3 and 4, respectively. The score lines 22 are formed such that the container 10 can be reduced, or broken, into discrete sections by overcoming a tear or opening force at the score lines 22.

Figure 2:
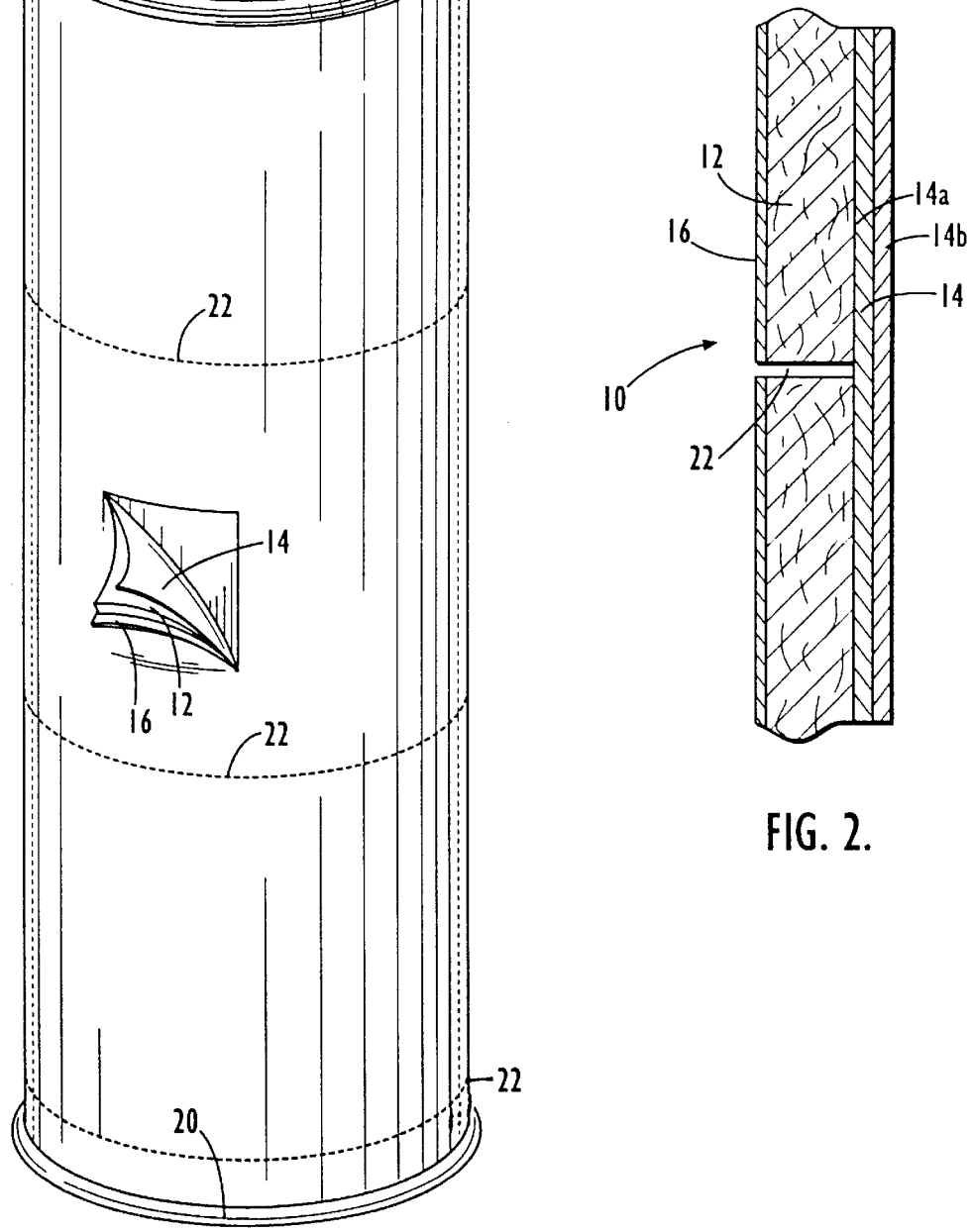
FIG. 2 is section view of the wall of the multi-ply composite container of FIG. 1.
Figure 3:
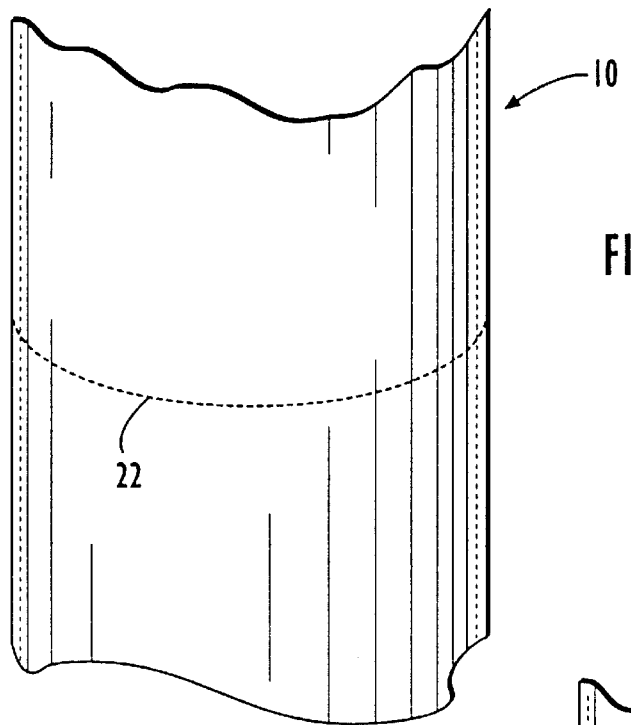
FIG. 3 is an enlarged perspective view of the multi-ply composite container of FIG. 1 specifically demonstrating a circumferential score line of perforations in the label ply and the body ply of the container.
Figure 4:
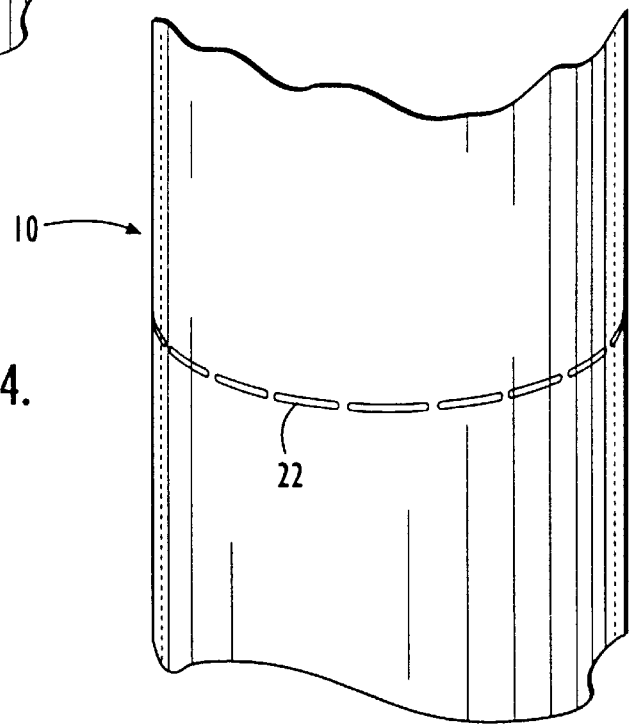
FIG. 4 is an enlarged perspective view of the multi-ply composite container of FIG. 1 specifically demonstrating a circumferential score line of discontinuous grooves in the label ply and the body ply of the container.

The liner ply 14 can include one or more layers as shown in FIG. 2. In particular, conventional liner plies often comprise several layers including a barrier layer to prevent the passage of moisture and gasses into and out of the container. One type of liner ply includes a foil barrier layer 14a and an overlying polymer layer 14b. Another type comprises layers which are made of polymeric materials. In one embodiment, the score lines 22 extend to the foil barrier layer 14a although in some instances the score lines may not extend entirely through the thickness of the body ply 12.

Figure 5:
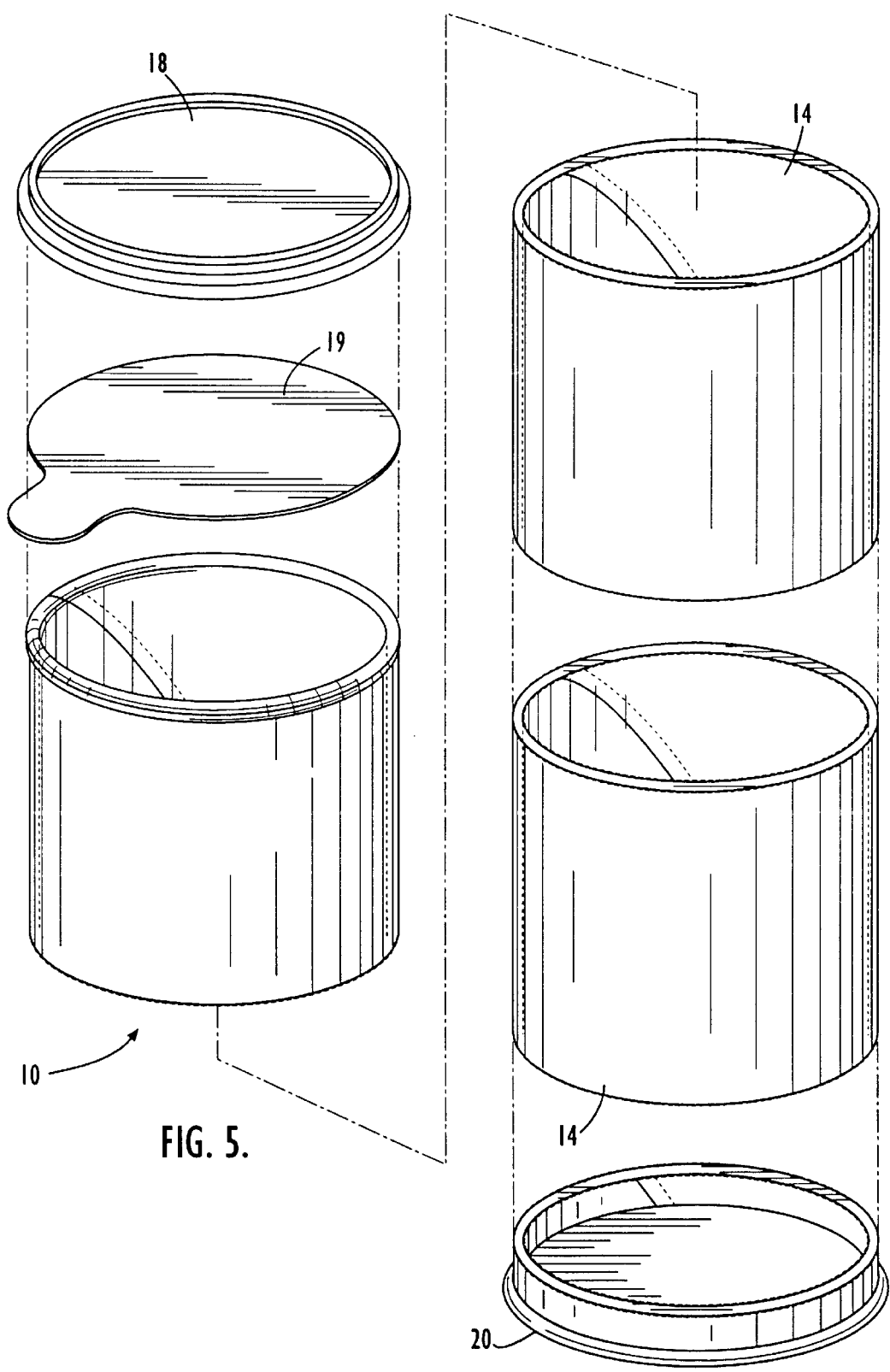
FIG. 5 is an exploded perspective view of the multi-ply composite container of FIG. 1.

As demonstrated in FIG. 5, the score lines 22 create regions of weakened strength in the composite container 10 and thereby permit the composite container 10 to be reduced, or broken, into discrete sections. As the volume of the food product within the composite container 10 is reduced through consumption, therefore, the size of the composite container 10 can advantageously be reduced or broken apart by hand, section by section, to conform to the volume reduction of the food product. Further, as more fully described in co-pending U.S. application Ser. No. 09/562,180, filed concurrently herewith and fully incorporated herein by reference, the overcap 18 is reversible so that one side of the overcap 18 is designed to engage the top of the composite container 10 after the flexible seal 19 is removed, and a second side of the overcap 18 is designed to engage the periphery of the remaining sections of the composite container 10. Therefore, the remaining sections of the composite container 10, with the reversible overcap 18, combine to form discrete containers for left over food product.

Advantageously, therefore, although the composite container 10 may begin as a tall, narrow tubular container to accommodate the volume of food product, the size of the container in accordance with the present invention reduces with the volume of food product. Thus, the composite container 10 solves the problem of the consumer being unable to reach the food near the bottom of the container as the food is consumed. The container is no longer too small in diameter to allow an adult hand to reach into the container or too tall to allow the fingers alone to reach the food near the container bottom. The composite container 10 is reducible, section by section, so that its size will continuously compliment and accommodate the volume of food product in the container.

Figure 6:
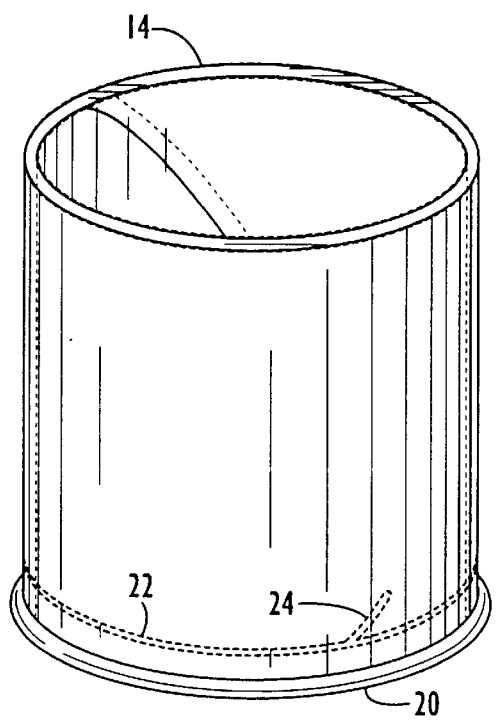
FIG. 6 is an enlarged view of an end of the multi-ply composite container of FIG. 1 specifically illustrating a score line intersecting a circumferential score line.

As shown in FIGS. 1 and 5, in one embodiment, at least one score line is located near the plastic or metal end closure 20 of the composite container 10. This embodiment advantageously permits the plastic or metal end closure 20 to be snapped off or removed from the composite container 10, thereby facilitating recycling of the composite body portion of the composite container 10 and the metal or plastic end closure 20. As shown in FIG. 6, in another embodiment, an angular score line 24 may be included in the composite container 10 intersecting the score line 22. The angular score line 24 further weakens the composite container 10 at the intersection of the angular score line 24 and the circumferential score line 22, thereby enhancing the ease with which the end closure 20 of the composite container 10 may be removed.

Figure 7:
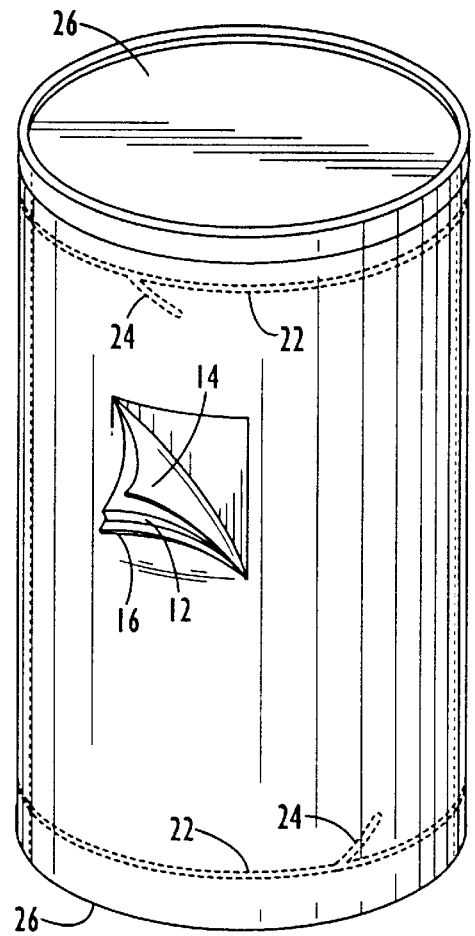
FIG. 7 is a multi-ply composite container according to the present invention with a composite end closure.
Figure 8:
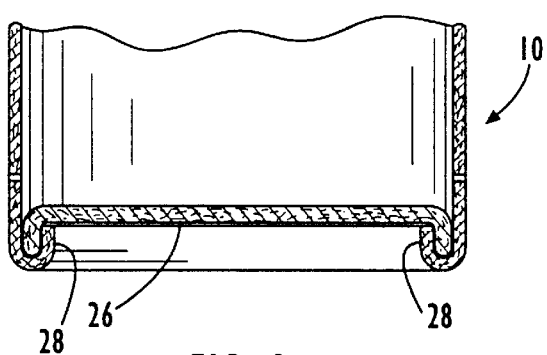
FIG. 8 is a section view of the multi-ply composite container of FIG. 7.
Figure 9:
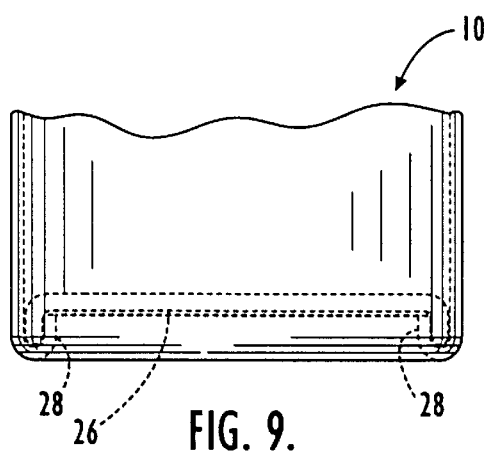
FIG. 9 is a side view of the multi-ply composite container of FIG. 7.

The embodiment of the composite container 10 illustrated in FIGS. 7 through 11 is particularly advantageous for packaging frozen juices, such as concentrated orange juice. In addition to including the tubular body ply 12, the liner ply 14 and the label ply 16, the embodiment shown in FIGS. 7 through 11 includes a pair of composite end closures 26. The composite end closures 26 are constructed of a body ply and a liner ply (not shown) and are secured to the composite container 10 by a retaining rim 28 located at the ends of the container 10, as shown in FIGS. 8 and 9.

The composite container 10 of this embodiment also includes circumferentially extending score lines 22 located in the area of the composite end closures 26 to facilitate opening of the composite container 10 and removal of the food product. As shown in FIGS. 7 and 9, the composite container 10 may additionally include angular score lines 24 intersecting the circumferential score lines 22 to further weaken the intersection point of the angular score lines 24 with the score lines 22 to further facilitate removal of the composite end closures 26.

Figure 10:
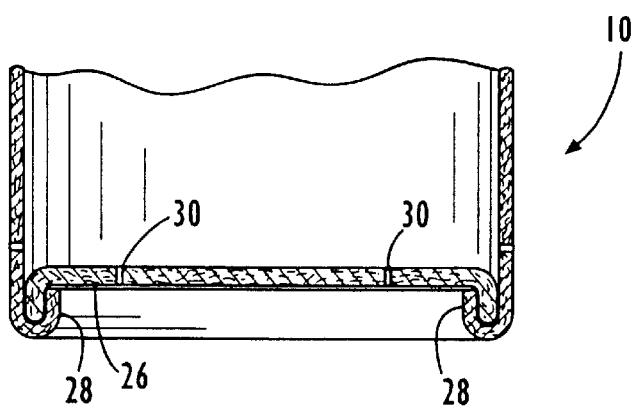
FIG. 10 is a section view of the multi-ply composite container of FIG. 7 illustrating a score line in one of the composite end closures of the container.
Figure 11:
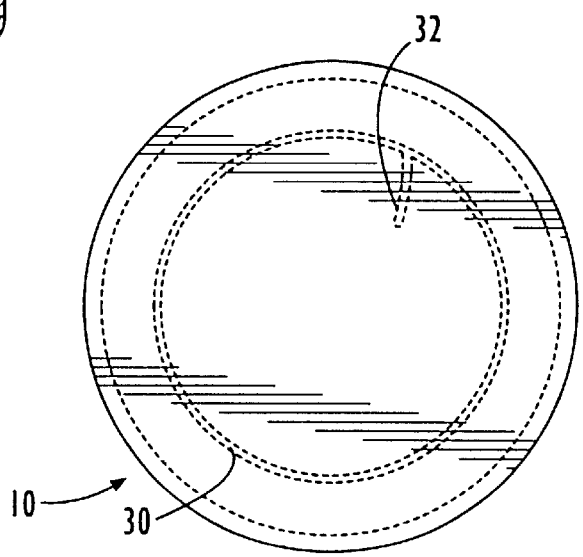
FIG. 11 is an end view of the composite end closure of the multi-ply composite container of FIG. 10.

In another embodiment, shown in FIGS. 10 and 11, a score line 30, and an angular score line 32, which intersects score line 30, may be included in the composite end closures 26 of the composite container 10. This embodiment of the composite container 10 facilitates removal of the food product from the container by puncturing the end closures 26 and removing the food product therethrough.

Figure 12:
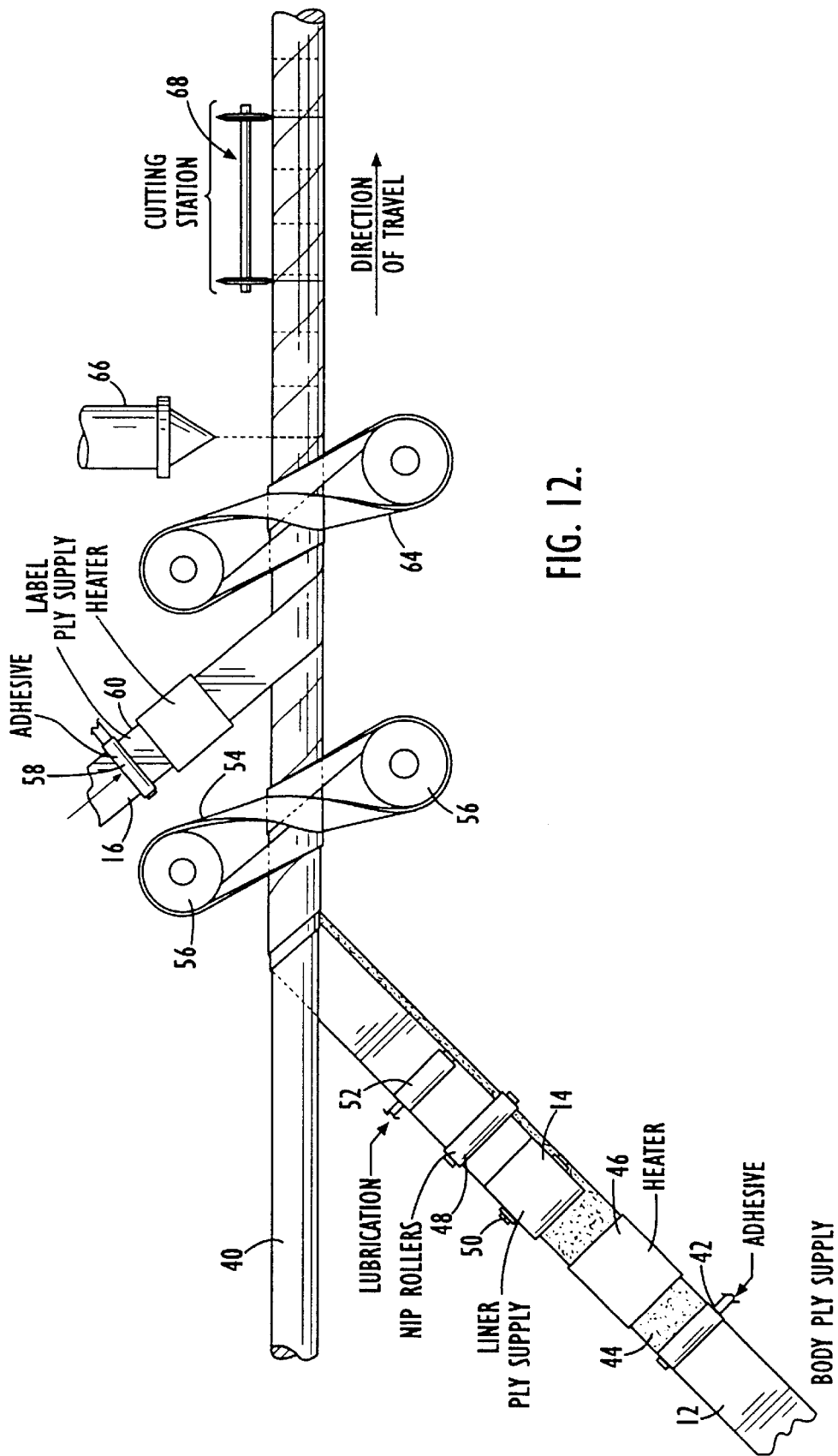
FIG. 12 is a plan view illustrating the method for making a multi-ply composite container according to the present invention using a laser for scoring the container.

FIG. 12 illustrates a method for making a multi-ply composite container with a region of weakened strength according to the present invention. A continuous strip of paperboard body ply material 12 is first advanced toward a shaping mandrel 40. As the paperboard body ply material 12 is advanced toward the shaping mandrel 40, the body ply 12 is advanced through an adhesive applicator 42 which applies an adhesive 44 to the inner surface of the body ply 12.

The body ply 12 and the adhesive 44 applied thereto are then passed underneath a heater 46 to render the adhesive 44 substantially tacky. A preferred type of heat source is an infrared heater although various other heat sources, e.g., forced air heating or the like can also be used.

After passing underneath the heater 46, the body ply 12 is then advanced into a pair of opposed nip rollers 48. A continuous strip of liner ply material 14 is fed from a reel 50 and is also advanced into the nip 48 adjacent the adhesived inner surface of the body ply 12. The adhesive 44 is substantially tacky and thus instantaneously bonds to the liner ply 14 without slippage as they are nipped together. It will be understood to those skilled in the art that various liner constructions with various barrier materials or properties could be employed depending upon the item being packing in the composite container 10. In addition, the body ply 12 and liner ply 14 could be brought together from opposite sides of the mandrel 40 and adhered together while on the mandrel. The liner ply 14 may be wider or narrower than the body ply 12 depending on the amount of liner overlap that is desired.

After advancing the body ply 12 and the liner ply 14 through the pair of nip rollers 48, the liner ply 14 may then be coated with lubricant from a roller 52, which allows the liner ply 14 to slide smoothly during the winding operation.

The body ply 12/liner ply 14 laminate is next wrapped around the shaping mandrel 40. The laminate is first wrapped under the mandrel 40 and then back over the top in a helical fashion with the liner ply 14 wound against the surface of the mandrel 40. As the body ply 12/liner ply 14 laminate advances back under the mandrel 40 after one complete revolution, its trailing edge is brought into contact with the leading edge of the ensuing portion of the body ply 12/liner ply 14 laminate, which is first coming into contact with the mandrel 40. The edges become abutted together to form a spirally wound tube that advances along the mandrel 40.

The tube is then advanced down the mandrel 40 by a conventional winding belt 54 that extends around a pair of opposed pulleys 56. The winding belt 54 not only rotates and advances the tube, but applies pressure to the overlapping edges of the body ply 12 and liner ply 14 to ensure a secure bond between the respective ply edges.

Downstream of the winding belt 54, a continuous label ply 16 is advanced toward the shaping mandrel 40 through an adhesive applicator 58 which applies an adhesive 60 to the inner surface of the label ply 16. The label ply 16 and the adhesive 60 applied thereto are then passed underneath a heater 62 to render the adhesive substantially tacky.

After passing underneath the heater 46, the label ply 16 is then wrapped around the shaping mandrel 40 onto the advancing body ply 12/liner ply 14 laminate. The wrapped plies are then advanced down the mandrel 40 by a winding belt 64. The winding belt 64 rotates and advances the wrapped plies and applies pressure to the overlapping edges of the plies to ensure a secure bond between the respective ply edges.

After the label ply 16 is adhered to the advancing body ply 12/liner ply 14 laminate on the mandrel 40 to create a continuous multi-ply composite tube 10, the continuous tube 10 is scored through the label ply 16 and the body ply 12 to create a region of weakened strength in the composite tube 10. In the embodiment shown in FIG. 12, the scoring is performed using a laser 66. A laser 66 is particularly useful with a foil liner 14 because the metal foil component of the liner helps prevent the laser from cutting entirely through the container wall. The scoring step may, however, also be achieved using a knife or cutting station. After the continuous multi-ply composite tube 10 is scored, the composite tube is cut into discrete lengths at a cutting station 68, and then removed from the mandrel 40.

Accordingly, the container and method of the present invention overcome limitations imposed by conventional composite containers and methods of manufacturing such containers. In particular, the multi-ply composite container and method for manufacturing same of the present invention provide a composite container which provides for easy opening, better consumer access, resealability, storage for left over food product and easier consumer recycling. The container and method of the present invention will therefore not only result in decreased production costs and reduce inefficiencies in the manufacture of composite containers, but also will produce a more useful, "environmentally friendly" composite container.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims. For example, the tubular containers according to the present invention are not necessarily helically wound but may instead be longitudinally wrapped to create a "convolute" tube having an axially extending seam. In addition, although the tubular containers according to the present invention have been described primarily in connection with food products, it is to be understood that the containers could be used in connection with other products. Although specific terms are employed herein, they are used in a generic and descriptive sense only and not for purposes of limitation.

That which is claimed:

1. A multi-ply composite container for consumer products with at least one region of weakened strength, comprising:
   a multi-ply composite tube comprising,
   a tubular body ply formed of paperboard material having inner and outer surfaces and opposed ends,
   a liner ply adhered to said inner surface of said tubular body ply, and a label ply adhered to said outer surface of said body ply;
   at least one circumferential score line in said multi-ply composite tube through said label ply and into said body ply but not through said liner ply for allowing the volume of the multi-ply composite container to be reduced as the volume of consumer product in the container is reduced; and
   at least one angular score line in said multi-ply composite tube through said label ply and said body ply intersecting said circumferential score line.

2. A multi-ply composite container for consumer products with at least one region of weakened strength, comprising:
   a multi-ply composite tube comprising,
   a tubular body ply formed of paperboard material having inner and outer surfaces and opposed ends,
   a liner ply adhered to said inner surface of said tubular body ply, and
   a label ply adhered to said outer surface of said body ply; and at least one circumferential score line in said multi-ply composite tube through said label ply and into said body ply but not through said liner ply for allowing the volume of the multi-ply composite container to be reduced as the volume of consumer product in the container is reduced, wherein said circumferential score line extends only partially around the circumference of said multi-ply composite tube.

3. A multi-ply composite container for consumer products with at least one region of weakened strength, comprising:
   a multi-ply composite tube comprising,
   a tubular body ply formed of paperboard material having inner and outer surfaces and opposed ends,
   a liner ply adhered to said inner surface of said tubular body ply, and
   a label ply adhered to said outer surface of said body ply;
   at least one composite end closure having a liner ply and a body ply secured to one of said opposed ends of said multi-ply composite tube; and
   at least one score line in the body ply of said at least one composite end closure to create a region of weakened strength in said composite end closure for allowing removal of said at least one composite end closure.

4. A multi-ply composite container with at least one region of weakened strength as defined in claim 3, further comprising at least one angular score line through the body ply of said composite end closure intersecting said score line.

* * * * *